United States Patent
Utz

(10) Patent No.: US 8,061,630 B2
(45) Date of Patent: Nov. 22, 2011

(54) INSERTION BODY FOR A SPRAY NOZZLE ASSEMBLY, AND SPRAY NOZZLE ASSEMBLY

(75) Inventor: Daniel Utz, Bad Bellingen (DE)

(73) Assignee: A. Raymond et Cie, Grenoble (FR)

( * ) Notice: Subject to any disclaimer, the term of this patent is extended or adjusted under 35 U.S.C. 154(b) by 31 days.

(21) Appl. No.: 12/524,290

(22) PCT Filed: Jan. 24, 2008

(86) PCT No.: PCT/EP2008/000507
§ 371 (c)(1),
(2), (4) Date: Jul. 23, 2009

(87) PCT Pub. No.: WO2008/107043
PCT Pub. Date: Sep. 12, 2008

(65) Prior Publication Data
US 2010/0078509 A1    Apr. 1, 2010

(30) Foreign Application Priority Data
Mar. 8, 2007  (DE) .......................... 10 2007 011 331

(51) Int. Cl.
*B05B 1/10* (2006.01)

(52) U.S. Cl. .................................. 239/284.1; 239/589.1
(58) Field of Classification Search .............. 239/284.1, 239/284.2, 589.1
See application file for complete search history.

(56) References Cited

U.S. PATENT DOCUMENTS

| 4,463,904 | A | * | 8/1984 | Bray, Jr. ..................... 239/589.1 |
| 5,906,317 | A | * | 5/1999 | Srinath ....................... 239/284.1 |
| 5,937,908 | A |   | 8/1999 | Inoshiri et al. |
| 7,111,793 | B2 |  | 9/2006 | Maruyama et al. |
| 2003/0234303 | A1 | * | 12/2003 | Berning et al. ............ 239/589.1 |
| 2004/0251315 | A1 |  | 12/2004 | Maruyama et al. |
| 2007/0257133 | A1 |  | 11/2007 | Bettenhausen et al. |

FOREIGN PATENT DOCUMENTS

DE    102004046781 A1    4/2006
* cited by examiner

*Primary Examiner* — Steven J Ganey
(74) *Attorney, Agent, or Firm* — Baker & Daniels LLP

(57) ABSTRACT

An insert body (10) for a spray nozzle assembly (1) has a fan jet producing section (17) for producing an oscillating, large-area fan jet and a point jet producing section (18) for producing at least one point jet located in the wetting area of the fan jet. It is thereby ensured that even if the fan jet collapses or is pushed aside, the surface is wetted at least by the or each point jet, which are much more forgiving from a fluid dynamics standpoint.

6 Claims, 5 Drawing Sheets

INSERTION BODY FOR A SPRAY NOZZLE ASSEMBLY, AND SPRAY NOZZLE ASSEMBLY

CROSS-REFERENCE TO RELATED APPLICATION

This application is a U.S. National Phase Patent Application based on International Application Ser. No. PCT/EP2008/000507 filed Jan. 24, 2008, the disclosure of which is hereby explicitly incorporated by reference herein.

BACKGROUND OF THE INVENTION

1. Field of the Invention

The present invention is directed to an insert body for a spray nozzle assembly, and to a spray nozzle assembly equipped with such an insert body.

2. Description of the Related Art

One insert body for a spray nozzle assembly is known from U.S. Pat. No. 4,463,904 A. The prior insert body comprises a fan jet producing section, which can be impinged on by a fluid via an insert entrance channel and is adapted to produce an oscillating fan jet, issuing from a fan jet exit opening, in order to wet a surface, typically the windshield of a motor vehicle. Although a relatively large-area fan jet can be produced under certain temperature conditions by means of a spray nozzle assembly equipped with such an insert body, there is a problem in that in the presence of unfavorable fluid mechanical boundary conditions, for example a low temperature or a high relative speed of the spray nozzle assembly compared to the surrounding medium, as is the case, for example, with a vehicle traveling at a relatively high speed, the fan jet fails to form or, due to the wind pressure, fails to impinge on the areas of the windshield that are to be wetted down.

SUMMARY OF THE INVENTION

The present invention provides an insert body for a spray nozzle assembly, by means of which a surface can be wetted reliably even under unfavorable boundary conditions.

This object is further achieved according to the invention, in connection with a spray nozzle assembly, by means of a spray nozzle assembly comprising an insert body according to the invention.

Because the insert body comprises, in addition to the fan jet producing section, a point jet producing section whose antechamber is in fluid mechanical communication with the insert entrance channel and is able to emit fluid in the direction of the fan jet via at least one point jet channel, there is, in addition to the fan jet, which is more sensitive to external influences, at least one point jet that can usually be produced without problems of any kind and is therefore reliably present, and which wets the windshield at least satisfactorily even if the fluid jet collapses due to unfavorable fluid mechanical boundary conditions or is pushed aside by high wind pressure.

In one form thereof, the present invention provides an insert body for a spray nozzle assembly for wetting a surface, including a fan jet producing section able to be impinged on by fluid via an insert entrance channel and provided to produce an oscillating fan jet that issues from a fan jet exit opening, characterized in that a point jet producing section is present that includes a collection chamber, which is in fluid mechanical communication with the insert entrance channel and which has at its disposal at least one point jet channel extending from the collection chamber and from a point jet exit opening and provided to produce at least one point jet in the direction of the fan jet.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
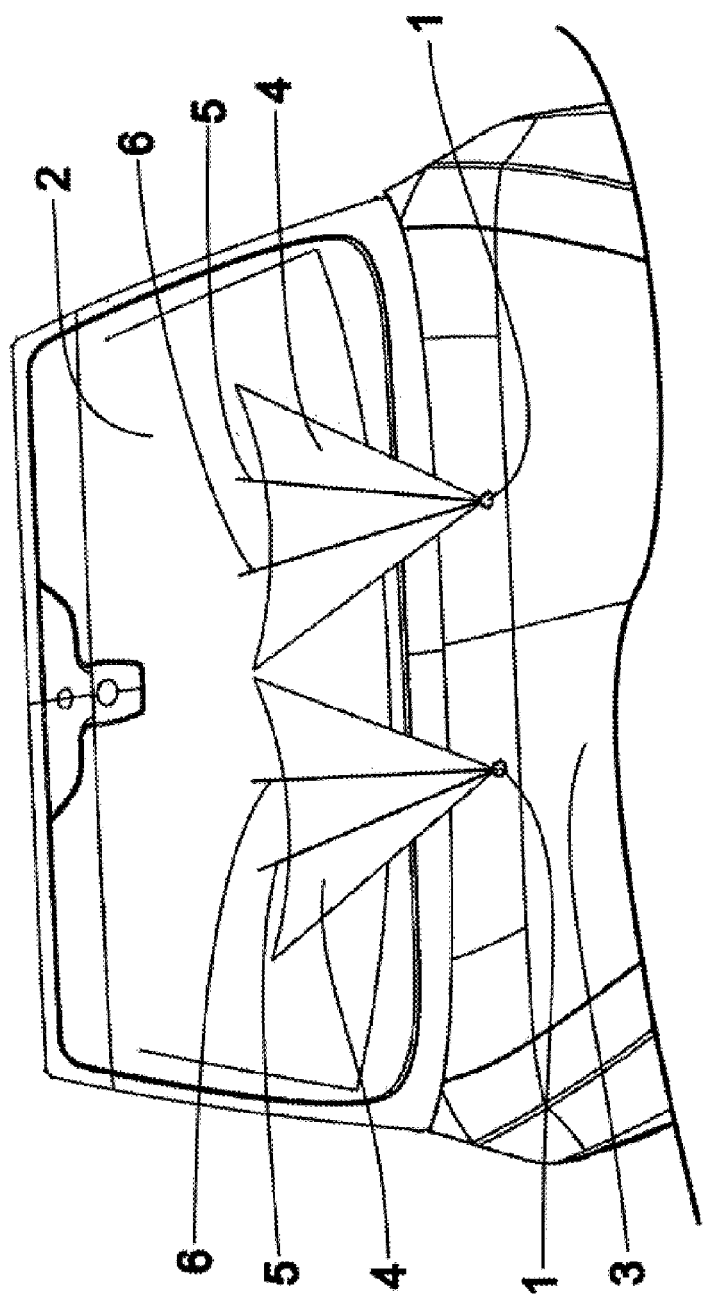
FIG. 1 is a graphic perspective view of a spray nozzle assembly with an insert body according to the invention for producing a fan jet and two point jets.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 is a graphic perspective view of one exemplary embodiment of the invention, comprising two identically constructed spray nozzle assemblies 1, which are connected in the region of a windshield 2 to a hood 3 of a motor vehicle. As can readily be seen from FIG. 1, each spray nozzle assembly 1 serves to produce, in a manner described in more detail below, a fan jet 4, which extends from the particular spray nozzle assembly 1 over a relatively broad range of angles transverse to the direction of travel, said range typically being about 20 degrees to about 50 degrees, in a plane intersecting the surface of the windshield 2, and a first point jet 5 and a second point jet 6, each of which preferably extends from said spray nozzle assembly 1 approximately midway between the center line of the fan jet 4 and its edges and impinges on the windshield 2 in the manner of a filiform jet of fluid with a continuous, volume-conveying core.

Figure 2:
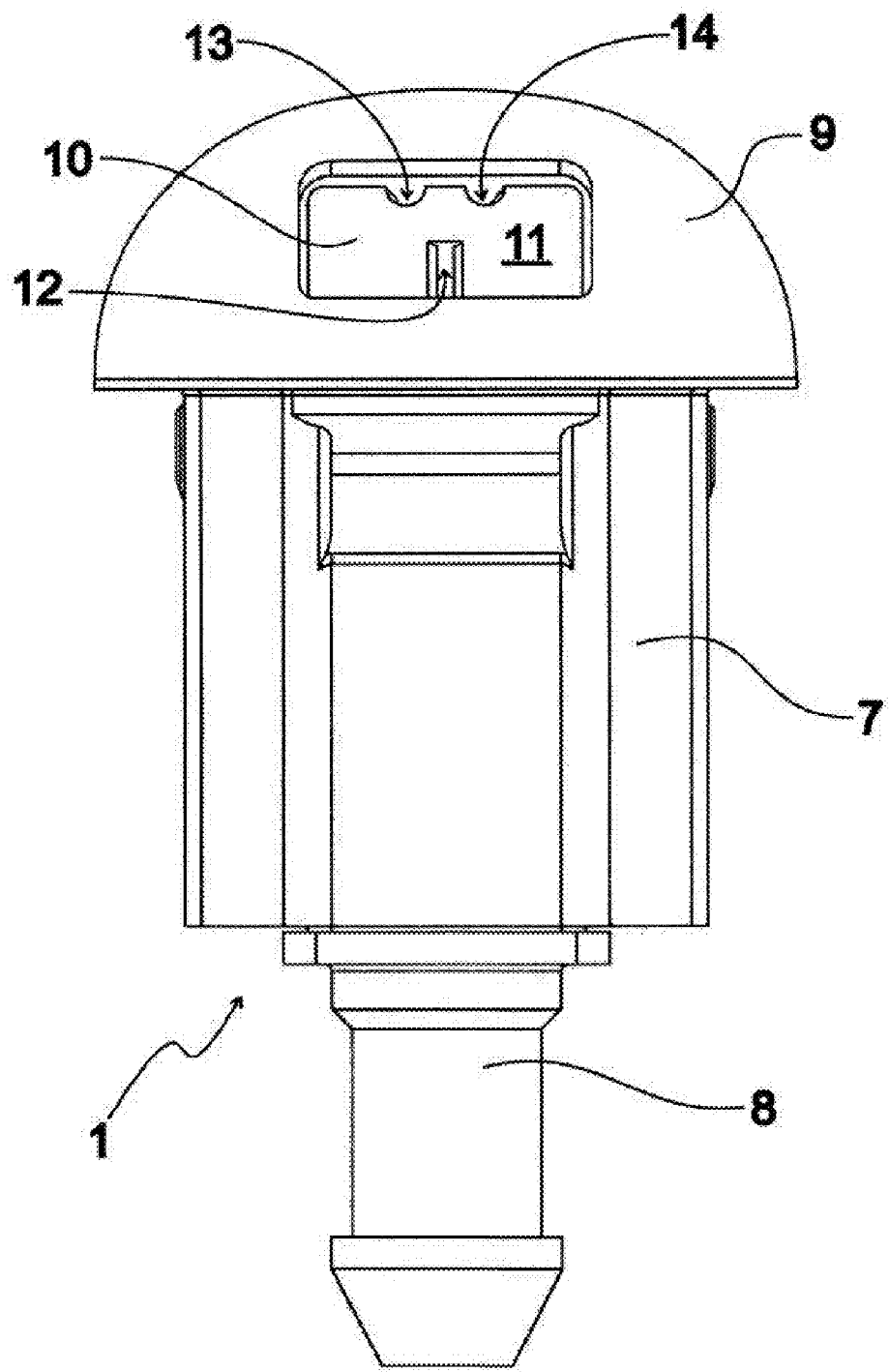
FIG. 2 is a front view of the spray nozzle assembly according to FIG. 1.

FIG. 2 is a front view of a spray nozzle assembly 1 according to the exemplary embodiment of FIG. 1. The spray nozzle assembly 1 comprises a nozzle body 7 on which is formed an adapter 8 for effecting connection to a fluid delivery system not shown in FIG. 2. Configured on the opposite side of nozzle body 7 from adapter 8 is a nozzle body 9, into which an insert body 10 according to the invention is fitted sealingly in terms of fluid mechanics.

It can be seen from FIG. 2 that the one-piece insert body 10 is configured with a rectangular end face 11, which is turned toward the viewer in the representation according to FIG. 2, and which is penetrated by a narrow, rectangular fan jet exit opening 12, disposed adjacent a long edge side and extending from that long edge side into approximately the center of the end face 11. Configured on the other long edge side of the end face 11 are a first point jet exit opening 13 and a second point jet exit opening 14, which are configured as semicircular and open toward the particular long edge side, and are arranged symmetrically one on each side of the fan jet exit opening 12.

Figure 3:
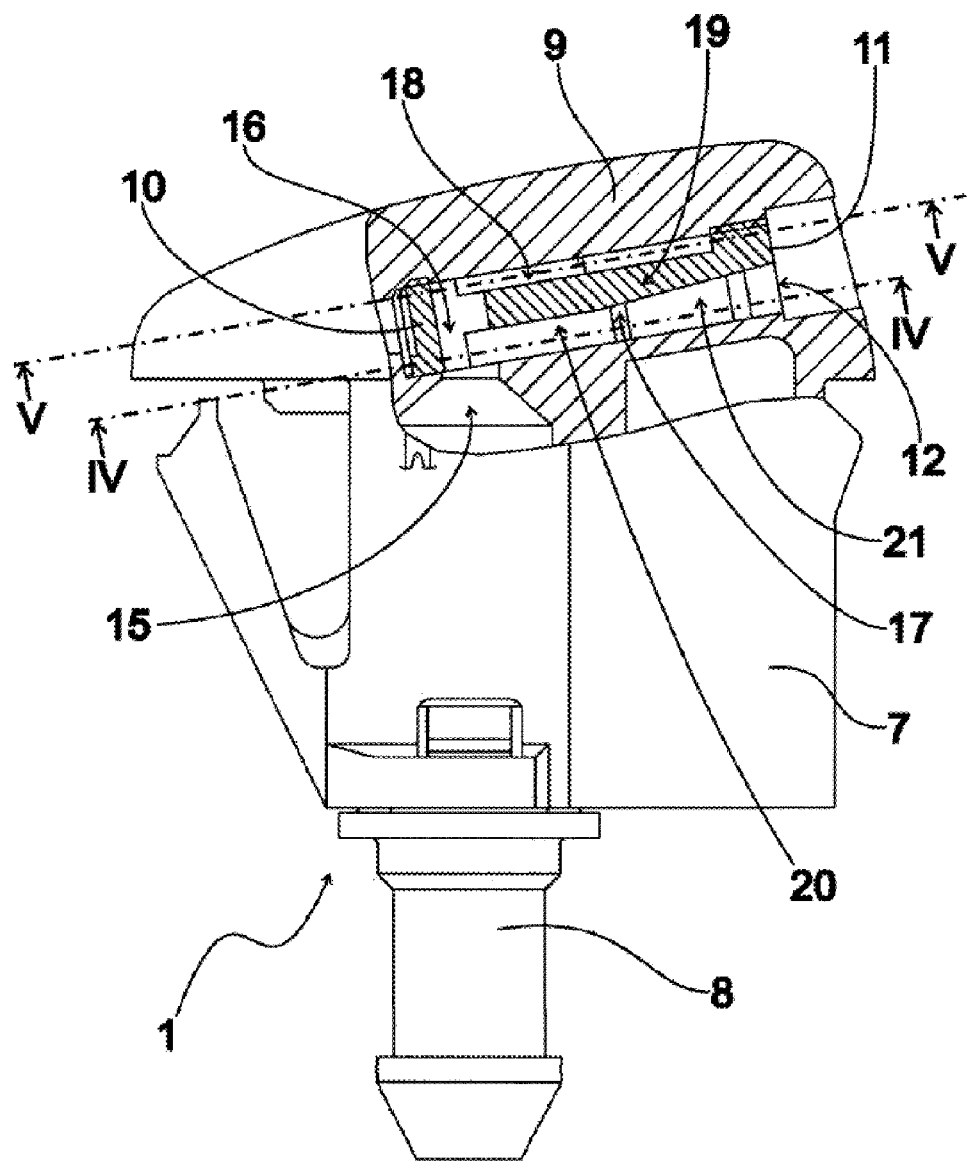
FIG. 3 is a partially cut-away side view of the spray nozzle assembly according to FIG. 2.

FIG. 3 shows the spray nozzle assembly 1 according to FIG. 2 in a side view, which is cut away in the region of insert body 10. It can be appreciated from FIG. 3 that a delivery channel 15 extending from adapter 8 through nozzle body 7 opens into an insert entrance channel 16 configured in insert body 10 on the opposite side of insert body 10 from end face 11, which insert entrance channel 16 extends over the entire thickness direction of the square-shaped insert body 10 and is sealed on the side facing away from delivery channel 15 by the nozzle head 9.

Insert entrance channel 16 is connected to a fan jet producing section 17 and to a point jet producing section 18, both of which—fan jet producing section 17 and point jet producing section 18—extend from insert entrance channel 16 to end face 11 and are open to the outside of the insert body 10, with the result that the nozzle body 9 performs the function of sealing insert body 10 to the outside, while inside the insert body 10, a partition 19 is provided between fan jet producing section 17 and point jet producing section 18.

It can be appreciated from FIG. 3 that fan jet producing section 17 comprises an antechamber 20 of constant height, which on the one side is in communication with insert entrance channel 16, and which, on the side remote from insert entrance channel 16, gives way to an expansion chamber 21 whose height increases from antechamber 20 toward end face 11.

Figure 4:
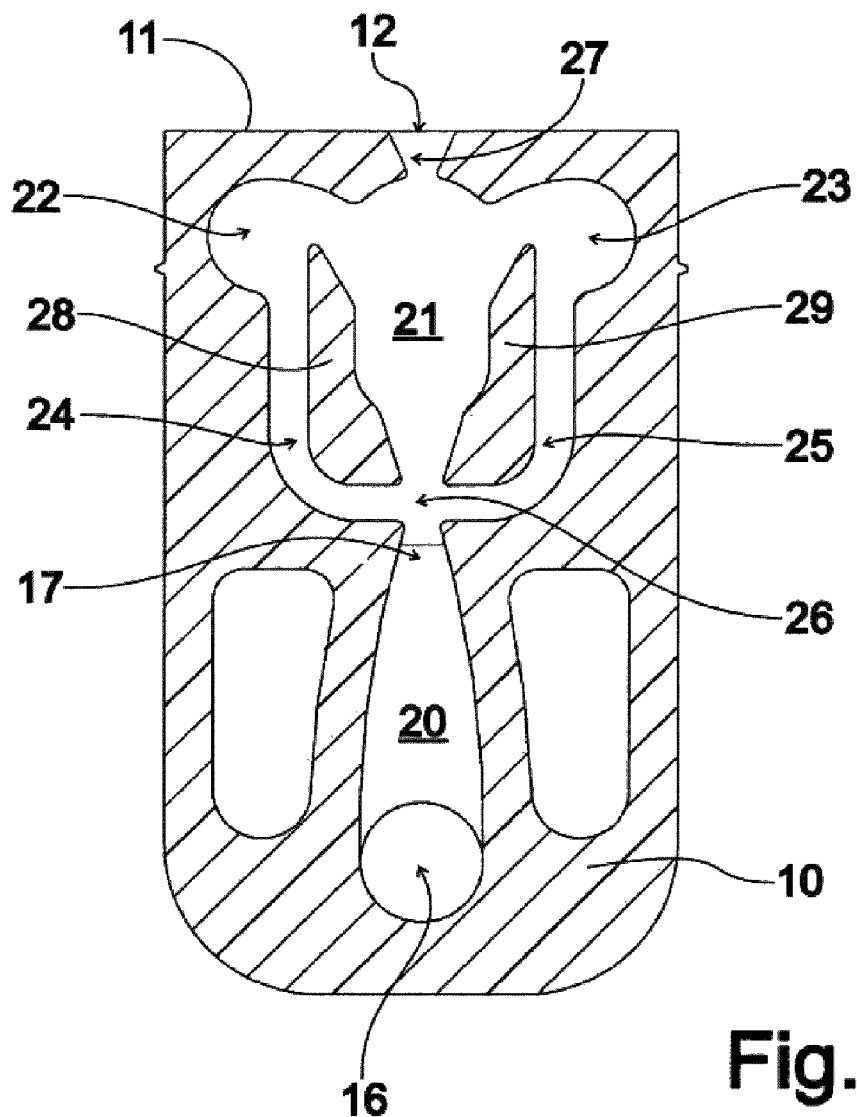
FIG. 4 is a section through the insert body according to the exemplary embodiment of FIG. 3 along line IV-IV.

FIG. 4 shows the insert body 10 according to FIG. 3 in section along line IV-IV, located in the region of fan jet producing section 17. It can be appreciated from FIG. 4 that the antechamber 20 narrows in width from the insert entrance channel 16 toward the expansion chamber 21, and that configured one on each side of expansion chamber 21, in the end region proximate end face 11, are return channels 24, 25 that begin with outward-bulging pressure pulse return regions 22, 23, and open into an intersection region 26 configured in the constriction between antechamber 20 and the expansion chamber 21, which broadens gradationally in width in the direction of end face 11. A fan jet exit channel 27 extends centrally from the end of expansion chamber 21 proximate end face 11, and broadens in width from expansion chamber 21 to fan jet exit opening 12.

With this construction of the fan jet producing section 17, a pressure pulse in intersection region 26 can, in a manner known per se, be coupled via pressure pulse feedback from the side of expansion chamber 21 proximate end face 11 through pressure pulse return regions 22, 23 and return channels 24, 25 into intersection region 26 and fed back into expansion chamber 21, and leads, by reflection from the gradationally widening boundary surfaces of expansion chamber 21, which are formed on separating walls 28, 29, to the shape of the fan jet 4 described and illustrated in connection with FIG. 1.

Figure 5:
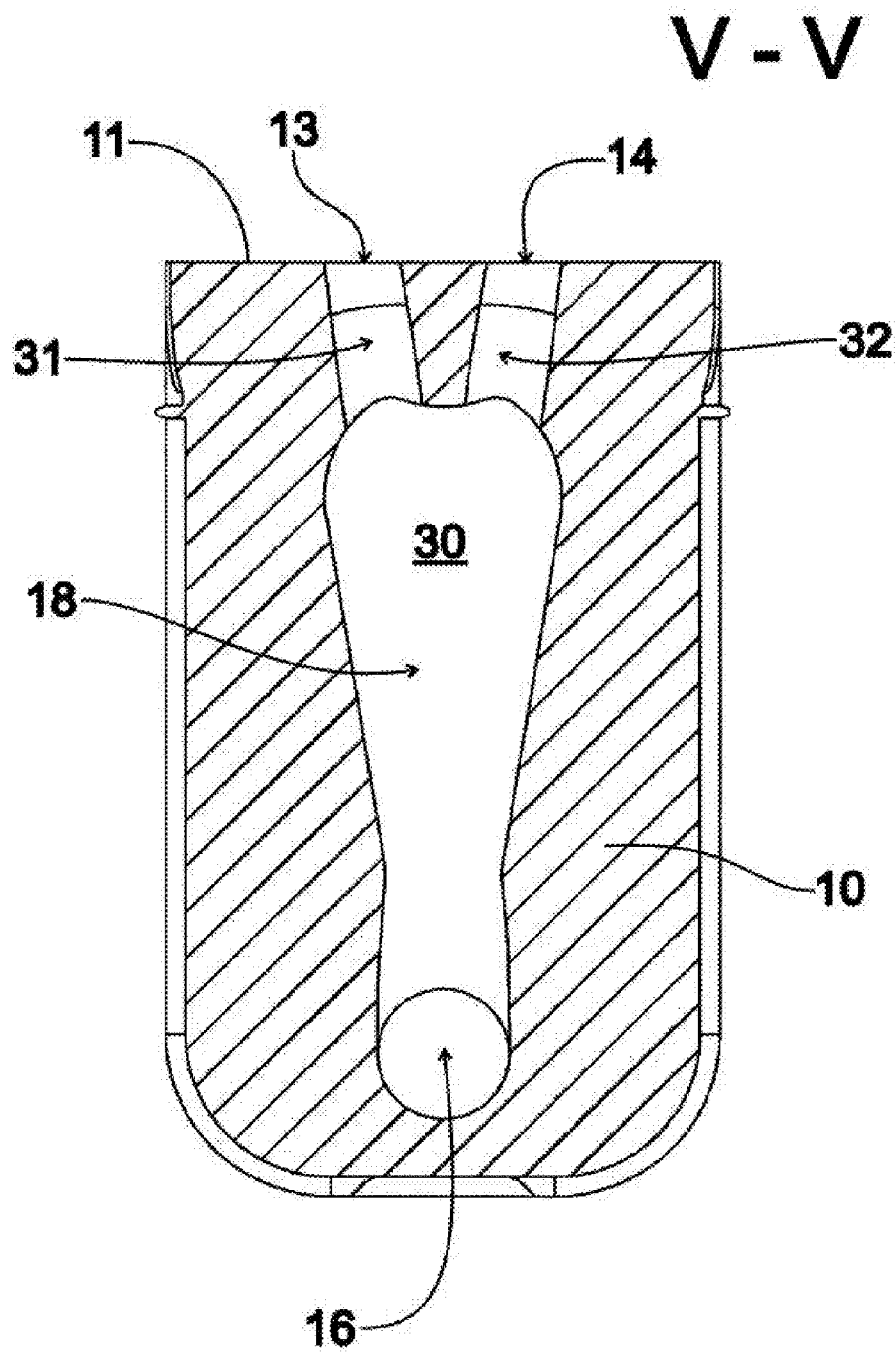
FIG. 5 is a section through the insert body according to the exemplary embodiment of FIG. 3 along line V-V.

FIG. 5 shows the insert body 10 according to FIG. 3 in section along line V-V located in the region of point jet producing section 18. It is evident from FIG. 5 that configured in point jet producing section 18 is a collection chamber 30 that extends from insert entrance channel 16 toward end face 11, initially with a constant and thereafter a widening cross section. Opening into collection chamber 30 on the side remote from insert entrance channel 16 are two point jet channels 31, 32, which are disposed symmetrically to a central longitudinal axis and have a substantially smaller cross section than the cross section of collection chamber 30 in the region remote from insert entrance channel 16, and each of which opens into a respective fan jet exit opening 13, 14. By virtue of this configuration of point jet producing section 18, directed point jets emerge from point jet exit openings 13, 14 and undergo relatively little widening over the path of the jet, yielding the shape of the point jets 5, 6 explained and illustrated in connection with FIG. 1.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An insert body for a spray nozzle assembly for use in wetting a surface, said insert body comprising:
    a fan jet producing section including a fan jet exit opening, said fan jet producing section in fluid communication with an insert entrance channel, and adapted to produce a fan jet that issues from said fan jet exit opening along a direction; and
    a point jet producing section including a collection chamber in fluid communication with said insert entrance channel, and at least one point jet channel extending from said collection chamber, each point jet channel including a point jet exit opening adapted to produce at least one point jet in said direction of said fan jet, said collection chamber having a constant cross-section portion extending from said insert entrance channel and a widening cross-section portion connecting to said point jet channel.

2. The insert body of claim 1, wherein said point jet producing section includes at least two point jet channels.

3. The insert body of claim 2, wherein said point jet exit openings arc disposed symmetrically one on each side of said fan jet exit opening.

4. The insert body of claim 1, wherein said insert body is formed as one piece having a substantially square shape with outer sides, said fan jet producing section and said point jet producing section respectively formed in an opposite pair of said outer sides.

5. The insert body of claim 4, wherein said insert body is disposed within a nozzle head, said nozzle head sealing said fan jet producing section and said point jet producing section to the outside.

6. The insert body of claim 1, wherein each point jet channel is defined by a pair of parallel walls.

* * * * *